(12) United States Patent
Kashiwakura et al.

(10) Patent No.: US 12,394,316 B2
(45) Date of Patent: Aug. 19, 2025

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Toshiki Kashiwakura, Nagakute (JP); Takahiro Aoki, Nagoya (JP); Tsuyoshi Okada, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 18/349,236

(22) Filed: Jul. 10, 2023

(65) Prior Publication Data

US 2024/0021082 A1 Jan. 18, 2024

(30) Foreign Application Priority Data

Jul. 15, 2022 (JP) .................. 2022-114198

(51) Int. Cl.
*G08G 1/00* (2006.01)
*G06Q 50/40* (2024.01)
*G06V 20/52* (2022.01)
*G08G 1/123* (2006.01)

(52) U.S. Cl.
CPC ............. *G08G 1/202* (2013.01); *G06Q 50/40* (2024.01); *G06V 20/53* (2022.01); *G08G 1/123* (2013.01)

(58) Field of Classification Search
CPC ........ G08G 1/202; G08G 1/123; G06Q 50/40; G06Q 10/02; G06Q 10/04; G06V 20/53
See application file for complete search history.

(56) References Cited

U.S. PATENT DOCUMENTS

| | | | |
|---|---|---|---|
| 2018/0211541 A1* | 7/2018 | Rakah | G06Q 10/047 |
| 2020/0124425 A1* | 4/2020 | Wengreen | G01C 21/3438 |
| 2020/0211144 A1 | 7/2020 | Hasegawa et al. | |
| 2021/0256847 A1 | 8/2021 | Kojo et al. | |
| 2022/0410795 A1* | 12/2022 | Tatara | F21S 43/15 |
| 2023/0401950 A1* | 12/2023 | Nagata | G06Q 30/015 |

FOREIGN PATENT DOCUMENTS

| | | |
|---|---|---|
| JP | 2003173497 A | 6/2003 |
| JP | 2020107215 A | 7/2020 |
| JP | 2020149619 A | 9/2020 |
| JP | 2020165786 A | 10/2020 |
| WO | 2019/220206 A1 | 11/2019 |

* cited by examiner

*Primary Examiner* — Omeed Alizada
(74) *Attorney, Agent, or Firm* — Dickinson Wright, PLLC

(57) ABSTRACT

An information processing apparatus autonomously determines a pick-up location for an on-demand bus. The information processing apparatus has a controller configured to determine a first location that is not predicted to be crowded with people as the pick-up location based on a user's preferred pick-up location and first information related to locations within the operation area of the on-demand bus that are predicted to be crowded with people. The controller of the information processing apparatus selects the first location thus determined as the pick-up location for the on-demand bus.

14 Claims, 7 Drawing Sheets

LOCATION MANAGEMENT DATABASE D110

| LOCATION ID | FACILITY | EVENT | APPARATUS ID |
|---|---|---|---|
| S0001 | **** | ~** | D0001 |
| S0002 | ****** | NOT SCHEDULED | D0002 |
| ⋮ | ⋮ | ⋮ | ⋮ |

[Fig. 5]

RESERVATION MANAGEMENT DATABASE D120

| RESERVATION ID | USER ID | BUS ID | PICK-UP LOCATION | PICK-UP TIME | DROP-OFF LOCATION | DROP-OFF TIME |
|---|---|---|---|---|---|---|
| R0001 | U0001 | B001 | S0002 | ****** | S0006 | ****** |
| R0002 | U0002 | B002 | S0001 | ****** | S0005 | ****** |
| ⋮ | ⋮ | ⋮ | ⋮ | ⋮ | ⋮ | ⋮ |

INFORMATION PROCESSING APPARATUS AND INFORMATION PROCESSING METHOD

CROSS REFERENCE TO THE RELATED APPLICATION

This application claims the benefit of Japanese Patent Application No. 2022-114198, filed on Jul. 15, 2022, which is hereby incorporated by reference herein in its entirety.

BACKGROUND

Technical Field

The present disclosure relates to an information processing apparatus and an information processing method.

Description of the Related Art

When a location where a ride-share vehicle and users (or riders) are appointed to meet is predicted to be crowded, a known literature teaches to divide the users into those who tend to come to the meeting location early and those who tend to come to the meeting location late and to set different meeting time zones for the former users and the latter users (see, for example, Patent Literature 1 in the citation list below).

CITATION LIST

Patent Literature

Patent Literature 1: Japanese Patent Application Laid-Open No. 2020-149619.

SUMMARY

An object of this disclosure is to provide a technology that allows users to board an on-demand bus smoothly.

In one aspect of the present disclosure, there is provided an information processing apparatus configured to determine a pick-up location for an on-demand bus. The information processing apparatus may include, in an exemplary mode, a controller including at least one processor configured to determine a first location that is not predicted to be crowded with people as the pick-up location for a user based on a pick-up location that the user prefers and first information related to locations that are predicted to be crowded with people.

In another aspect of the present disclosure, there is provided an information processing method for determining a pick-up location for an on-demand bus. The information processing method may include, in an exemplary mode, determining by a computer a first location that is not predicted to be crowded with people as the pick-up location for a user based on a pick-up location that the user prefers and first information related to locations that are predicted to be crowded with people.

In another aspect of the present disclosure, there is also provided an information processing program configured to cause a computer to implement the above-described information processing method or a non-transitory storage medium storing such an information processing program in a computer-readable manner.

According to the present disclosure, there is provided a technology that allows users to board an on-demand bus smoothly.

DESCRIPTION OF THE EMBODIMENTS

On-demand buses have become widespread recently. The on-demand bus is a shared vehicle that is operated according to requests for a ride from users. The locations of the bus stops of the on-demand bus at which users are picked up by (or board) it are determined dynamically according to the users' preferred pick-up locations. Hence, the pick-up location at which a user is to be picked up by the on-demand bus may not be marked with a bus stop sign like a regular bus stop. Then, there is a possibility that the pick-up location may be crowded with people who do not use the on-demand bus. Crowding at the pick-up location may make it difficult for the user to find the pick-up location. Even if the user can find the pick-up location, there is a possibility that the user cannot come close to the pick-up location. Then, it may be difficult to allow the user to board the on-demand bus smoothly.

In view of the above, the controller of the information processing apparatus disclosed herein is configured to select a first location that is not predicted to be crowded with people as the pick-up location for the user based on the user's preferred pick-up location and first information related to locations that are predicted to be crowded. The first information may include information on gatherings scheduled to be held at facilities linked with locations in the operation area of the on-demand bus. The term "gatherings" as used here refers to events where a large number of people gather, such as sporting events, concerts, exhibitions, and festivals. The controller may select the first location from among the locations linked with the facilities where no gathering is scheduled to be held. For example, the controller selects the location closest to the user's preferred pick-up location among the locations linked with the facilities where no gathering is scheduled to be held as the first location.

The information processing apparatus disclosed herein can select a location that is not predicted to be crowded as a pick-up location for the on-demand bus. This allows the user to board the on-demand bus smoothly.

An example of the information processing apparatus disclosed herein is a server apparatus run by the provider of on-demand bus service. The controller according to the present disclosure is a processor, such as a CPU (Central Processing Unit) or a DSP (Digital Signal Processor) provided in the server apparatus.

EMBODIMENT

In the following, a specific embodiment of the technology disclosed herein will be described with reference to the drawings. The features that will be described in connection with the embodiment are not intended to limit the technical scope of the disclosure only to them, unless otherwise stated. In the following description of the embodiment, a case where the information processing apparatus according to the present disclosure is applied to an on-demand bus system will be described.

(Outline of On-Demand Bus System)

Figure 1:
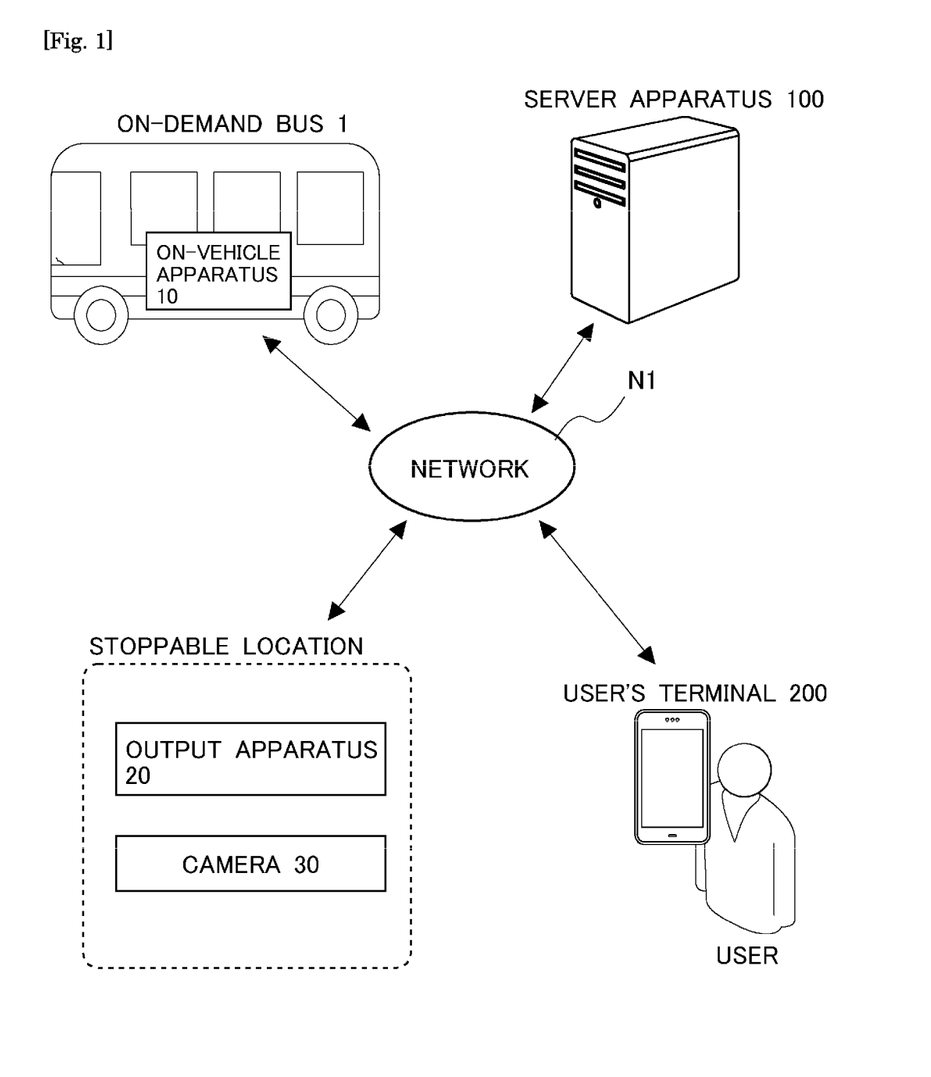
FIG. 1 is a diagram illustrating the general configuration of an on-demand bus system according to an embodiment.

FIG. 1 is a diagram illustrating the general configuration of an on-demand bus system according to the embodiment. The on-demand bus system according to the embodiment includes an on-vehicle apparatus 10, an output apparatus 20, a camera 30, a server apparatus 100, and a user's terminal 200. The on-vehicle apparatus 10, the output apparatus 20, the camera 30, the server apparatus 100, and the user's terminal 200 are connected through a network N1. The network N1 may be a WAN (Wide Area Network), which is a global public communication network such as the Internet, or other communication network. While FIG. 1 illustrates only one on-vehicle apparatus 10, one output apparatus 20, one camera 30, and one user's terminal 200 by way of example, the on-demand bus system may include a plurality of them.

The on-vehicle apparatus 10 is provided on the on-demand bus 1. The on-demand bus 1 is a shared vehicle that is operated according to requests for a ride from users. The on-demand bus 1 used in the system according to the embodiment is a vehicle capable of travelling autonomously by autonomous driving. The on-vehicle apparatus communicates with the server apparatus 100 through wireless communication to receive an operation plan transmitted from the server apparatus 100. The on-vehicle apparatus 10 sends the received operation plan to a control apparatus provided on the on-demand bus 1. The control apparatus is an apparatus that controls the autonomous travel of the on-demand bus 1. Alternatively, the on-demand bus 1 may be a vehicle that is manually driven by a crew (or driver). Then, the on-vehicle apparatus 10 may be configured to present the operation plan received from the server apparatus 100 to the crew of the on-demand bus 1. The on-vehicle apparatus 10 according to the embodiment also has the function of causing a signage device 14 described later to output a bus stop sign according to a command transmitted from the server apparatus 100.

The output apparatus 20 and the camera 30 are installed at each of a plurality of stoppable locations in the operation area of the on-demand bus 1. The stoppable locations mentioned here refer to locations on the roads on which the on-demand bus 1 can travel in the operation area at which the on-demand bus 1 can stop temporarily and the output apparatus 20 and the camera 30 are installed. The output apparatus 20 outputs a bus stop sign according to a command transmitted from the server apparatus 100. The camera 30 is used to capture an image of the stoppable location. The image captured by the camera 30 is transmitted to the server apparatus 100 through the output apparatus 20.

The server apparatus 100 receives requests for a ride from the users. The request for a ride includes the user's preferred pick-up location, the user's preferred pick-up time zone, the user's preferred drop-off location, and the user's preferred drop-off time zone. The server apparatus 100 creates an operation plan for the on-demand bus 1 based on the requests for a ride. For example, the operation plan includes the operation route of the on-demand bus 1, the pick-up locations, the pick-up times, the drop-off locations, and the drop-off times for the users.

When creating the operation plan for the on-demand bus 1, the server apparatus 100 according to the embodiment determines the pick-up location for each user based on the user's preferred pick-up location and first information. The first information is information related to a prediction of the crowding of people at each of the stoppable locations in the operation area of the on-demand bus 1. The server apparatus 100 selects a stoppable location that is not predicted to be crowded in the user's preferred pick-up time zone as the pick-up location for the user from among the stoppable locations located near the user's preferred pick-up location, for example, located within a certain distance (corresponding to the "second distance" according to the present disclosure) set between several meters and several hundred meters from the user's preferred pick-up location.

The server apparatus 100 according to the embodiment determines whether the pick-up location for the user is not actually crowded at a first time earlier than the pick-up time for the user based on an image captured by the camera 30 installed at the pick-up location for the user. The first time is the time that is a first time length earlier than the pick-up time for the user. For example, the first time length is set between several minutes and a few tens of minutes. Alternatively, the first time may be the time when the user comes near the pick-up location. For example, the first time may be the time when the distance between the user's terminal 200 and the pick-up location becomes shorter than a certain distance (corresponding to the "first distance" according to the present disclosure) that is set between several tens of meters and several hundred meters.

If it is determined that the pick-up location is not actually crowded at the first time, the server apparatus 100 causes the output apparatus 20 installed at the pick-up location to output a bus stop sign. If it is determined that the pick-up location is actually crowded at the first time, the server apparatus 100 changes the pick-up location for the user to another stoppable location that is not actually crowded and transmits information on the pick-up location after the change to the user's terminal 200. Moreover, the server apparatus 100 causes the output apparatus 20 installed at the pick-up location after the change to output a bus stop sign.

The user's terminal 200 has the function of receiving various information entered by the user regarding the use of the on-demand bus service and the function of presenting various information supplied from the server apparatus 100 to the user.

(Hardware Configuration of On-Demand Bus System)

Figure 2:
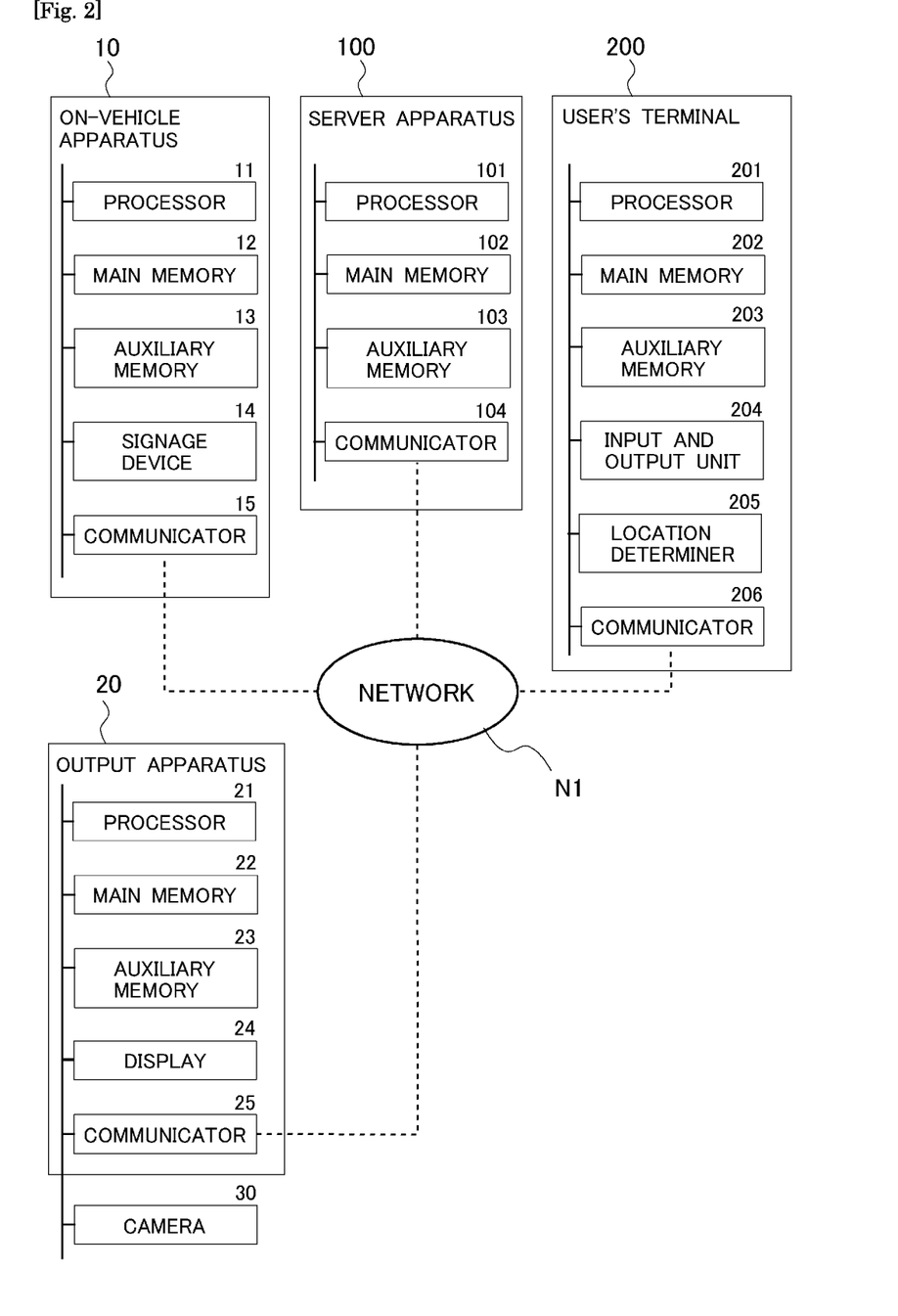
FIG. 2 is a diagram illustrating exemplary hardware configurations of an on-vehicle apparatus, an output apparatus, a server apparatus, and a user's terminal included in the on-demand bus system according to the embodiment.

The hardware configuration of the on-demand bus system according to the embodiment will be described with reference to FIG. 2. FIG. 2 is a diagram illustrating an example of the hardware configurations of the on-vehicle apparatus 10, the output apparatus 20, the server apparatus 100, and the user's terminal 200 included in the on-demand bus system illustrated in FIG. 1.

The on-vehicle apparatus 10 is a computer provided on the on-demand bus 1. As illustrated in FIG. 2, the on-vehicle apparatus 10 includes a processor 11, a main memory 12, an auxiliary memory 13, a signage device 14, and a communicator 15. The processor 11, the main memory 12, the auxiliary memory 13, the signage device 14, and the communicator 15 are interconnected by buses.

The processor 11 may be a CPU (Central Processing Unit) or a DSP (Digital Signal Processor). The processor 11 executes various processing by loading programs stored in the auxiliary memory 13 into the main memory 12 and executing them.

The main memory 12 is a storage device that provides a memory space and a work space for the processor 11 into which programs stored in the auxiliary memory 13 are loaded and serves as a buffer for computational processing. For example, the main memory 12 includes a semiconductor memory, such as a RAM (Random Access Memory) and a ROM (Read Only Memory).

The auxiliary memory 13 stores various programs and data used by the processor 11 when executing programs. For example, the auxiliary memory 13 may be an EPROM (Erasable Programmable ROM) or a hard disk drive (HDD). The auxiliary memory 13 may include a removable medium or a portable recording medium. Examples of the removable medium include a USB (Universal Serial Bus) memory and a disc recording medium, such as a CD (Compact Disc) or a DVD (Digital Versatile Disc). The auxiliary memory 13 stores various programs, various data, and various tables in the recording medium in such a way that they can be written into and read out from it. The programs stored in the auxiliary memory 13 include a program executed to relay information related to the operation of the on-demand bus 1 between the control apparatus of the on-demand bus 1 and the server apparatus 100 and a program executed to control the signage device 14 according to commands from the server apparatus 100, besides an operating system (OS).

The signage device 14 is a device that displays information to the outside of the on-demand bus 1. For example, the signage device 14 includes a display mounted on the outside wall of the on-demand bus 1. The signage device 14 according to the embodiment displays a bus stop sign on a display according to a command sent from the server apparatus 100.

The communicator 15 is a wireless communication circuit. For example, the wireless communication circuit provides the connection to the network N1 through wireless mobile communications, such as 4G (4th Generation), 5G (5th Generation), 6G (6th Generation), or LTE (Long Term Evolution) mobile communications. The wireless communication circuit may be configured to provide the connection to the network N1 using WiMAX, Wi-Fi (registered trademark) or other wireless communication scheme. The communicator 15 is connected to the network N1 by wireless communication to communicate with the server apparatus 100 through the network N1.

The on-vehicle apparatus 10 configured as illustrated in FIG. 2 relays transmission of information between the control apparatus of the on-demand bus 1 and the server apparatus 100. This relaying processing is performed by the processor 11 by loading a program stored in the auxiliary memory 13 into the main memory 12 and executing it. For example, when the communicator 15 receives an operation plan transmitted from the server apparatus 100, the processor 11 sends the received operation plan to the control apparatus of the on-demand bus 1. The processor 11 of the on-vehicle apparatus 10 causes the signage device 14 to output a bus stop sign according to a command sent from the server apparatus 100.

The hard ware configuration of the on-vehicle apparatus 10 is not limited to the configuration illustrated in FIG. 2, but some components may be added, removed, or replaced by other components fitly. The processing executed in the on-vehicle apparatus 10 may be executed by either hardware or software.

The output apparatus 20 is installed at each of a plurality of stoppable locations located in the operation area of the on-demand bus 1. The main function of the output apparatus is not to output a bus stop sign but to output other signs or information (for example, road signs and/or advertisements). Examples of the output apparatus 20 include a signage device mounted on a guardrail, a signage device mounted on a pole (e.g. a utility pole or a telephone pole), a signage device installed in a store, a road surface signage device provided on the road surface, a streetlight, and an LED lamp mounted on a guardrail.

The output apparatus 20 includes a processor 21, a main memory 22, an auxiliary memory 23, a display 24, and a communicator 25. The output apparatus 20 according to the embodiment is connected with the camera 30. The processor 21, the main memory 22, and the auxiliary memory 23 of the output apparatus 20 are similar to the processor 11, the main memory 12, and the auxiliary memory 13 of the on-vehicle apparatus 10 and will not be described further. However, it should be noted that the auxiliary memory 23 of the output apparatus 20 stores, besides the operating system, a program configured to implement the function of causing the display 24 to output a bus stop sign in the output apparatus 20 and a program configured to implement the function of transmitting images captured by the camera 30 to the server apparatus 100 in the output apparatus 20.

The display 24 outputs, for example, data input from the processor 21 on its display screen. The display 24 may be a liquid crystal display, a plasma display, an organic EL display, or other display. The camera 30 is configured to capture an image of the stoppable location at which the output apparatus 20 is installed. For example, the camera 30 captures images using an imager, such as a CCD (Charge Coupled Device) image sensor or a CMOS (Complementary Metal Oxide Semiconductor) image sensor.

The communicator 25 connects the output apparatus 20 to the network N1. The communicator 25 connects the output apparatus 20 to the server apparatus 100 through the network N1. For example, the communicator 25 includes a LAN (Local Area Network) interface board or a wireless communication circuit for wireless communication.

The output apparatus 20 configured as illustrated in FIG. 2 controls the display 24. The processing of controlling the display 24 is executed by the processor 21 by loading a program stored in the auxiliary memory 23 into the main memory 22 and executing it. For example, the processor 21 of the output apparatus 20 outputs a bus stop sign on the display 24 according to a command sent from the server apparatus 100. The processor 21 of the output apparatus 20 also transmits an image captured by the camera 30 to the server apparatus 100 according to a command from the server apparatus 10.

The hardware configuration of the output apparatus 20 is not limited to the configuration illustrated in FIG. 2, but some components may be added, removed, or replaced by other components fitly. The processing executed in the output apparatus 20 may be executed by either hardware or software.

The server apparatus 100 is a computer that manages the operation of the on-demand bus 1. The server apparatus 100 is run by the provider of the on-demand bus service. As illustrated in FIG. 2, the server apparatus 100 includes a processor 101, a main memory 102, an auxiliary memory 103, and a communicator 104. The processor 101, the main memory 102, the auxiliary memory 103, and the communicator 104 are interconnected by buses.

The processor 101, the main memory 102, the auxiliary memory 103, and the communicator 104 of the server apparatus 100 are similar to the processor 21, the main memory 22, the auxiliary memory 23, and the communicator 25 of the output apparatus and will not be described further. However, it should be noted that the programs stored in the auxiliary memory 103 of the server apparatus 100 include a program configured to implement the function of creating operation plans for the on-demand bus 1 in the server apparatus 100, a program configured to implement the function of causing the output apparatus 20 to output a bus stop sign in the server apparatus 100, and a program configured to implement the function related to changing the pick-up location of the users in the server apparatus 100.

The hardware configuration of the server apparatus 100 is not limited to the configuration illustrated in FIG. 2, but some components may be added, removed, or replaced by other components fitly. The processing executed in the server apparatus 100 may be executed by either hardware or software.

The user's terminal 200 is a computer used by a user who makes a request for a ride on the on-demand bus 1. The user's terminal 200 may be a smartphone, a tablet terminal, a wearable terminal, or a personal computer. As illustrated in FIG. 2, the user's terminal 200 includes a processor 201, a main memory 202, an auxiliary memory 203, an input and output unit 204, a location determiner 205, and a communicator 206. The processor 201, the main memory 202, the auxiliary memory 203, the input and output unit 204, and the communicator 206 are interconnected by buses.

The processor 201, the main memory 202, the auxiliary memory 203, and the communicator 206 of the user's terminal 200 are similar to the processor 11, the main memory 12, the auxiliary memory 13, and the communicator 15 of the on-vehicle apparatus 10 and will not be described further. However, it should be noted that the programs stored in the auxiliary memory 203 of the user's terminal 200 include, besides the operating system, a program configured to implement the functions related to the use of the on-demand bus service in the user's terminal 200.

The input and output unit 204 receives input operations conducted by the user and presents information to the user. For example, the input and output unit 204 includes a touch panel display and a control circuit thereof.

The location determiner 205 determines the present location of the user's terminal 200. For example, the location determiner 205 is a GPS (Global Positioning System) receiver. The location determiner 205 is not limited to a GPS receiver. For example, the location determiner 205 may be a wireless communication circuit that uses a location information service based on Wi-Fi (registered trademark) access points. For example, the location information determined by the location determiner 205 is the latitude and longitude or the address.

The user's terminal 200 configured as illustrated in FIG. 2 executes various processing related to the use of the on-demand bus service. Specifically, such processing is executed by the processor 201 by loading a program stored in the auxiliary memory 203 into the main memory 202 and executing it. The user's terminal 200 according to the embodiment interacts with the user. For example, the processor 201 of the user's terminal 200 receives the entry of various information related to the use of the on-demand bus service by the user and transmits the entered information to the server apparatus 100. The processor 201 of the user's terminal 200 also presents information supplied from the server apparatus 100 to the user.

The hardware configuration of the user's terminal 200 is not limited to the configuration illustrated in FIG. 2, but some components may be added, removed, or replaced by other components fitly. The processing executed in the user's terminal 200 may be executed by either hardware or software.

(Functional Configuration of Server Apparatus)

Figure 3:
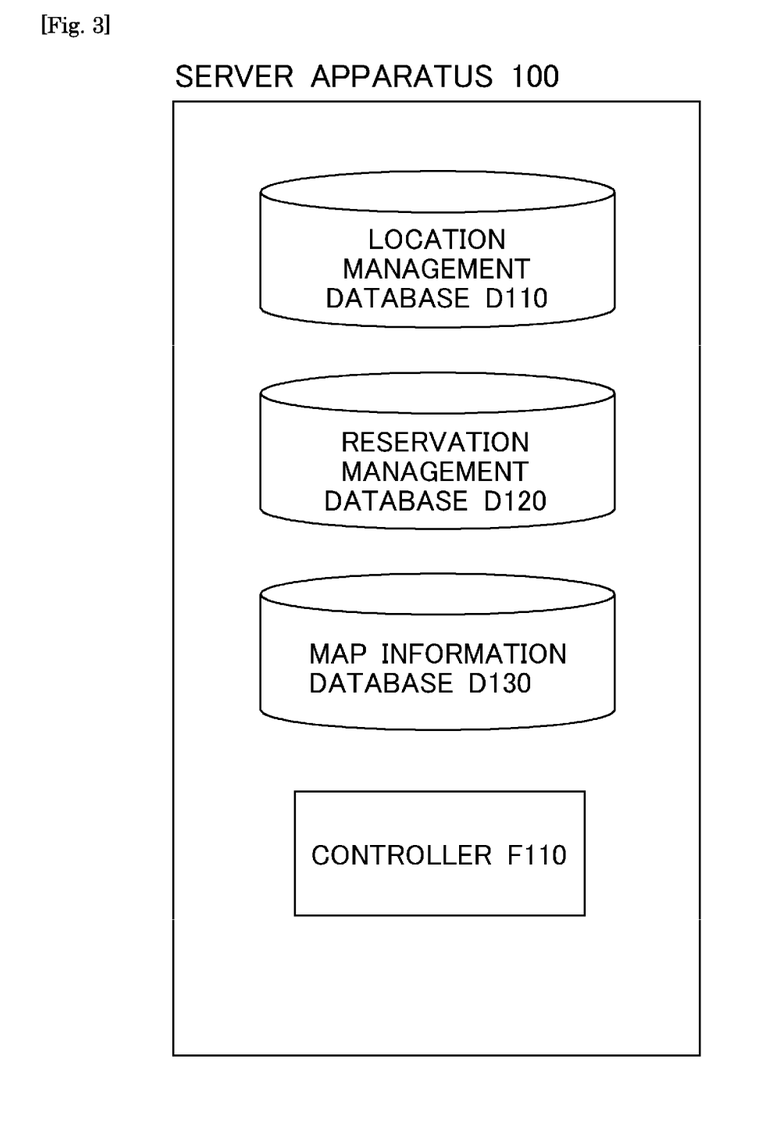
FIG. 3 is a block diagram illustrating an exemplary functional configuration of the server apparatus according to the embodiment.

The functional configuration of the server apparatus 100 according to the embodiment will be described with reference to FIG. 3. FIG. 3 is a block diagram illustrating an example of the functional configuration of the server apparatus 100. The server apparatus 100 according to the embodiment is an example of the information processing apparatus according to the present disclosure. The server apparatus 100 according to the embodiment also corresponds to the computer employed to implement the information processing method disclosed herein.

As illustrated in FIG. 3, the server apparatus 10 according to the embodiment includes, as software modules, a location management database D110, a reservation management database D120, a map management database D130, and a controller F110.

The location management database D110, the reservation management database D120, and the map management database D130 are constructed by a database management system program (DBMS program) executed by the processor 101. The location management database D110, the reservation management database D120, and the map management database D130 may be constructed as relational databases.

Figure 4:
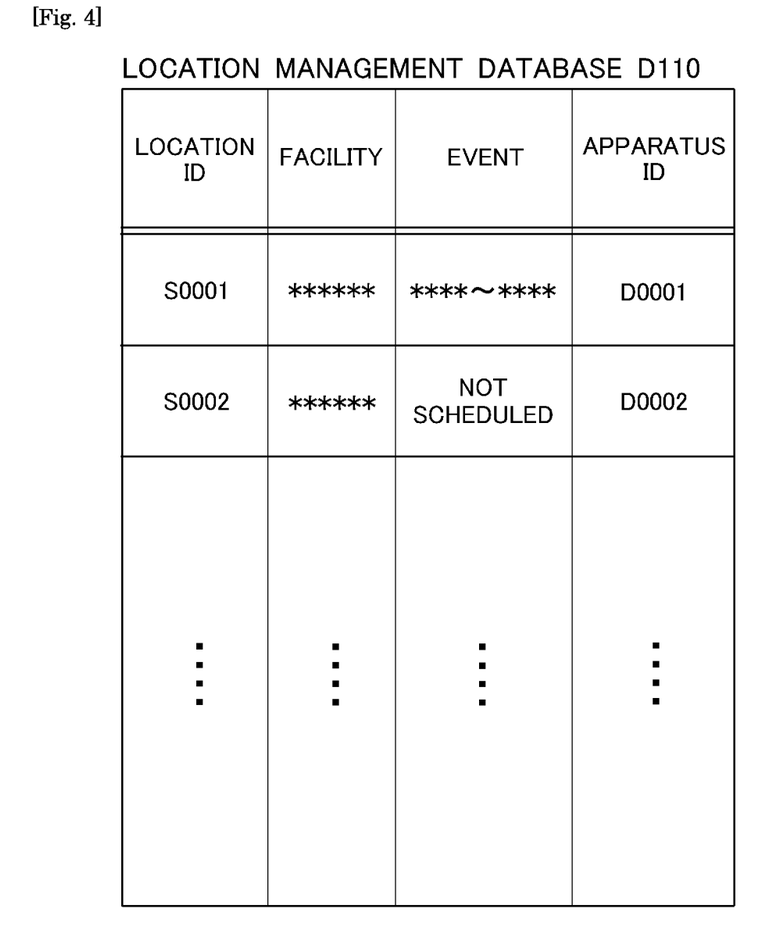
FIG. 4 illustrates an example of information stored in a location management database according to the embodiment.

The location management database D110 stores information on a plurality of stoppable locations in the operation area of the on-demand bus 1. FIG. 4 illustrates an example of the information stored in the location management database D110. The location management database D110 illustrated in FIG. 4 stores a plurality of records corresponding to the respective stoppable locations in the operation area of the on-demand bus 1. Each record stored in the location management database D110 has the fields of location ID, facility, event, and apparatus ID.

What is recorded in the location ID field is information that identifies each of the stoppable locations located in the operation area of the on-demand bus 1 (e.g. location ID). As described previously, the stoppable locations are locations on the roads on which the on-demand bus 1 can travel in the operation area at which the on-demand bus 1 can stop temporarily and the output apparatus 20 and the camera 30 are installed.

What is recorded in the facility field is information that identifies a facility linked with each stoppable location (e.g. the name of the facility). The facility mentioned here is a facility where a gathering can be held, and it is predicted that the stoppable location linked with the facility will be crowded during the period during which a gathering is held in the facility. The gathering mentioned above is an event that attracts many people, examples of which include a sporting event, a concert, an exhibition, and a festival.

What is recorded in the event field is information on the period during which an event is scheduled to be held in the facility linked with each stoppable location. In the case of the record of a stoppable location linked with a facility where no event is scheduled to be held, the information "not scheduled" is recorded in the event field.

What is recorded in the apparatus ID field is information that identifies the output apparatus 20 installed at each stoppable location (apparatus ID).

The structure of the record stored in the location management database D110 is not limited to the example illustrated in FIG. 4, but some fields may be added, changed, or deleted.

Figure 5:
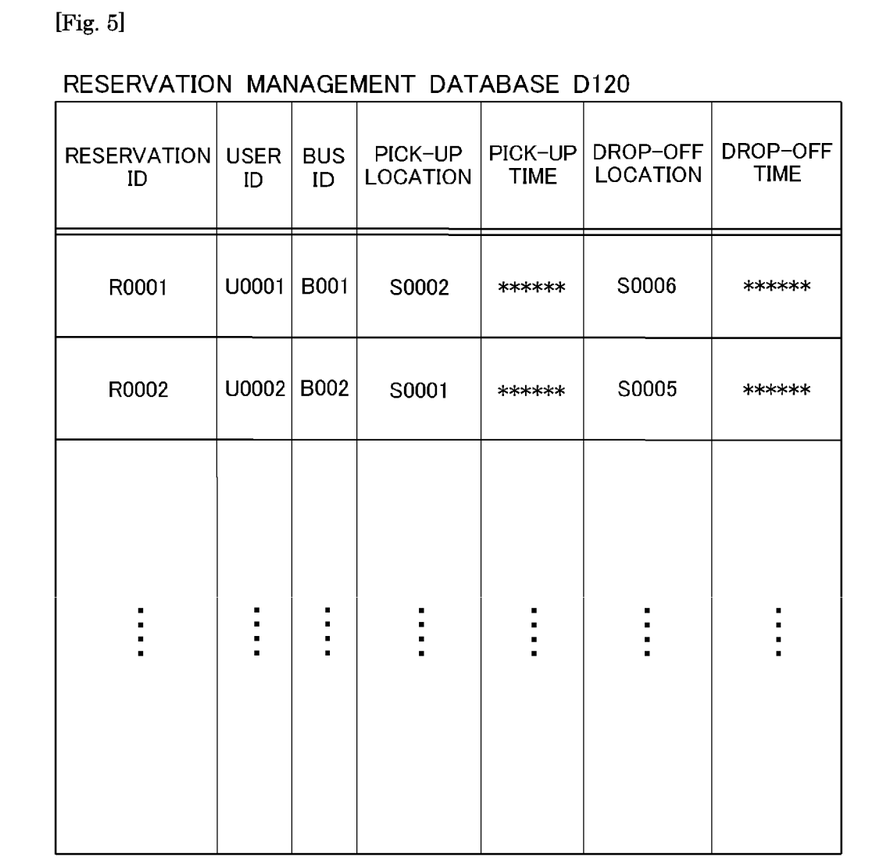
FIG. 5 illustrates an example of information stored in a reservation management database according to the embodiment.

Referring back to FIG. 3, the reservation management database D120 stores information on reservations of the on-demand bus 1. FIG. 5 illustrates an example of the information stored in the reservation management database D120. The reservation management database D120 illustrated in FIG. 5 stores a plurality of records respectively corresponding to a plurality of reservations. Each record in the reservation management database D120 records information on a single reservation for a ride for one user. Each record in the reservation management database D120 has the fields of reservation ID, user ID, bus ID, pick-up location, pick-up time, drop-off location, and drop-off time. Each record in the reservation management database D120 is created and stored in it when an operation plan of the on-demand bus 1 is created based on a request for a ride from the user.

What is recorded in the reservation ID field is information (reservation ID) that identifies each reservation. What is recorded in the user ID field is information (user ID) that identifies the user who is to be picked up by (or to board) the on-demand bus 1 with the reservation. What is recorded in the bus ID field is information that identifies the on-demand bus 1 to be dispatched for the reservation (bus ID).

What is recorded in the pick-up location field is information (location ID) that identifies the stoppable location selected as the pick-up location for the user who made the reservation. The location IDs used as the information recorded in the pick-up location field are common to the location IDs used in the location management database D110.

What is recorded in the pick-up time field is the time when the user who made the reservation is expected to be picked up by the on-demand bus 1 at the pick-up location, in other words, the time when the on-demand bus 1 is expected to arrive at or depart from the pick-up location.

What is recorded in the drop-off location field is the location ID of the stoppable location selected as the drop-off location for the user who made the reservation. As with the information recorded in the pick-up location field, the location IDs used as the information recorded in the drop-off location field are common to the location IDs used in the location management database D110.

What is recorded in the drop-off time field is the time when the user who made the reservation is expected to be dropped off by the on-demand bus 1 at the drop-off location, in other words, the time when the on-demand bus 1 is expected to arrive at or depart from the drop-off location.

The structure of the record stored in the reservation management database D120 is not limited to the example illustrated in FIG. 5, but some fields may be added, changed, or deleted.

Referring back to FIG. 3, the map information database D130 stores map information of the operation area of the on-demand bus 1. The map information stored in the map information database D130 includes information on the road links along which the on-demand bus 1 can travel, information indicating the stoppable locations in each of the road links along which the on-demand bus 1 can travel (e.g. the positions of the stoppable locations on the map and the location IDs of the respective stoppable locations).

The controller F110 is a software module that is implemented by the processor 101 of the server apparatus 100 by loading a program stored in the auxiliary memory 103 into the main memory 102 and executing it. The controller F110 according to the embodiment is an example of the controller in the information processing apparatus according to the present disclosure. Alternatively, the controller F110 may be implemented by a hardware circuit, such as an ASIC (Application Specific Integrated Circuit) or an FPGA (Field Programmable Gate Array). In this case, the hardware circuit corresponds to the controller according to the present disclosure.

When the communicator 104 receives a request for a ride transmitted from the user's terminal 200, the controller F110 executes the processing of accepting the request. The request for a ride is a signal containing information on the user's preferred pick-up location, the user's preferred pick-up time zone, the user's preferred drop-off location, and the user's preferred drop-off time zone. The controller F110 determines the on-demand bus 1 to pick up the user, the pick-up location, the pick-up time, the drop-off location, and the drop-off time for the user based on the information contained in the request for a ride. The controller F110 creates a new record as illustrated in FIG. 5 based on the details determined as above and adds the new record to the reservation management database D120.

The controller F110 according to the embodiment determines the pick-up location for the user through the following procedure. The controller F110 chooses the stoppable locations that are located within a second distance from the user's preferred pick-up location based on the map information stored in the map information database. Then, the controller F110 accesses the location management database D110 using the location IDs of the stoppable locations thus chosen as arguments. The controller F110 finds the records in which information identical to any one of the location IDs of the stoppable locations chosen as above is recorded in the location ID field from among the records stored in the location management database D110. Then, the controller F110 determines whether the information (scheduled event period) stored in the event field of each record thus found overlaps the user's preferred pick-up time zone. In other words, the controller F110 determines whether an event is scheduled to be held in the facility linked with each stoppable location chosen as above during the user's preferred pick-up time zone.

If the user's preferred pick-up time zone and the scheduled event period overlap, in other words, if an event is scheduled to be held in the facility linked with each stoppable location chosen as above during the user's preferred pick-up time zone, the controller F110 determines that the stoppable location in question is likely to be crowded with people. If the user's preferred pick-up time zone and the scheduled event period do not overlap, or if the information "not scheduled" is stored in the event field, no event is scheduled to be held in the facility linked with the stoppable location in question during the user's preferred pick-up time zone. Then, the controller F110 determines that the stoppable location in question is unlikely to be crowded with people. The above determination processing is executed for all the stoppable locations located within the second distance from the user's preferred pick-up location.

If there is only one stoppable location that is determined to be unlikely to be crowded, the controller F110 selects that stoppable location that is determined to be unlikely to be crowded as the pick-up location for the user. This location corresponds to the "first location" according to the present disclosure. If there are multiple stoppable locations that are determined to be unlikely to be crowded, the controller F110 selects the stoppable location closest to the user's preferred pick-up location among the stoppable locations that are determined to be unlikely to be crowded as the pick-up location for the user. The location thus selected also corresponds to the "first location" according to the present disclosure.

The method of determining the on-demand bus 1 to be used to pick up the user and the pick-up time, the drop-off location, and the drop-off time for the user is not limited particularly, but any known method may be employed.

Moreover, the controller F110 determines, at a first time, whether the first location selected as the pick-up location is not crowded actually for each of the reservations recorded in the reservation management database D120. Specifically, the controller F110 firstly calculates the time that is a first time length earlier than the expected pick-up time recorded in the pick-up time field of each record for all the reservations recorded in the reservation management database D12. Then, the controller F110 determines whether the time calculated as above coincides with the present time. This determination processing is executed at predetermined intervals (e.g. at intervals set between several seconds and several minutes). If there is a reservation for which the time that is the first time earlier than the expected pick-up time coincides with the present time, the controller F110 determines that the first time has arrived for that reservation.

If it is determined that there is a reservation for which the first time has arrived, the controller F110 reads out the information (location ID) stored in the pick-up location field of the record corresponding to the reservation for which the first time has arrived. The controller F110 accesses the location management database D110 using the read-out location ID as an argument. The controller F110 finds the record in which the information identical to the read-out location ID is recorded in the location ID field (i.e. the record corresponding to the first location) from among the records stored in the location management database D110.

The controller F110 identifies the output apparatus 20 installed at the first location based on the information (apparatus ID) stored in the apparatus ID field of the record corresponding to the first location. The controller F110 transmits a first command to the output apparatus 20 installed at the first location through the communicator 104. The first command is a signal that contains a command to capture an image of the first location by the camera 30 and a command to transmit the image captured by the camera 30 to the server apparatus 100.

When the communicator 104 of the server apparatus 100 receives the image transmitted from the output apparatus 20 at the first location in response to the first command, the controller F110 executes image recognition processing on the received image to determine whether the first location is not crowded with people. If it is determined that the first location is not crowded, the controller F110 transmits a second command to the output apparatus 20 at the first location through the communicator 104. The second command is a signal that contains a command to output a bus stop sign.

If it is determined that the first location is crowded, the controller F110 executes the processing of changing the pick-up location for the first user from the first location to a second location. Specifically, the controller F110 firstly chooses the stoppable locations that are located within the second distance from the first location based on the map information stored in the map information database D130.

The controller F110 accesses the location management database D110 using the location IDs of the stoppable locations chosen as above as arguments. The controller F110 finds the records in which information identical to any one of the location IDs of the stoppable locations chosen as above is recorded in the location ID field from among the records stored in the location management database D110. The controller F110 identifies the output apparatuses 20 installed at the stoppable locations chosen as above based on the information (apparatus IDs) recorded in the ID field of the records thus found.

The controller F110 transmits the first command to the output apparatuses 20 at the stoppable locations chosen as above through the communicator 104. When the communicator 104 of the server apparatus 100 receives an image transmitted from the output apparatus 20 in response to the first command, the control apparatus F110 executes image recognition processing on the received image to determine whether the stoppable location in question is not crowded. This determination processing is executed for all the stoppable locations located within the second distance from the first location.

If there is only one stoppable location that is determined to be not crowded among the stoppable locations that are located within the second distance from the first location, the controller F110 selects that stoppable location that is determined to be not crowded as the second location. If there are multiple stoppable locations that are determined to be not crowded, the controller F110 selects the stoppable location closest to the first location among those multiple stoppable locations as the second location.

Then, the controller F110 changes the pick-up location for the reservation for which the first time has arrived from the first location to the second location. Specifically, the controller F110 changes the information recorded in the pick-up location field of the corresponding record in the reservation management database D120 from the location ID of the first location to the location ID of the second location.

The controller F110 transmits a third command to the user's terminal 200 of the user associated with the reservation for which the first time has arrived through the communicator 104. The third command is a signal that contains a command to cause the input and output unit 204 of the user's terminal 200 to output a message indicating the change of the pick-up location from the first location to the second location and location information of the second location.

The controller F110 transmits a fourth command to the on-vehicle apparatus 10 of the on-demand bus 1 dispatched for the reservation for which the first time has arrived through the communicator 104. The fourth command is a signal that contains a command to change the pick-up location for the reservation in question from the first location to the second location and a command to cause the signage device 14 to output a bus stop sign when the on-demand bus 1 arrives at the second location. The on-demand bus 1 dispatched for the reservation for which the first time has arrived is identified by the information (bus ID) recorded in the bus ID field of the record of the reservation in question stored in the reservation management database D120.

The controller F110 transmits the second command to the output apparatus 20 at the second location through the communicator 104. As described above, the second command is a signal that contains a command to output a bus stop sign.

The method of determining whether the pick-up location (first location) for the reservation for which the first time has arrived is not actually crowded is not limited to the method based on an image captured by the camera 30 installed at the first location. For example, this determination may be made based on an image captured by a camera provided on a vehicle travelling near the first location at the first time. Alternatively, this determination may be made based on information supplied from a crew of a vehicle travelling near the first location at the first time or information supplied from a pedestrian walking near the first location at the first time.

The functional configuration of the server apparatus 100 is not limited to the configuration illustrated in FIG. 3, but some components may be removed, changed, or added. One or some of the software modules of the server apparatus or a portion of the processing executed by them may be implemented by another computer connected to the network N1. For example, the processing executed by the controller F110 may be executed by a plurality of computers in a distributed manner.

(Process Executed in Server Apparatus)

Figure 6:
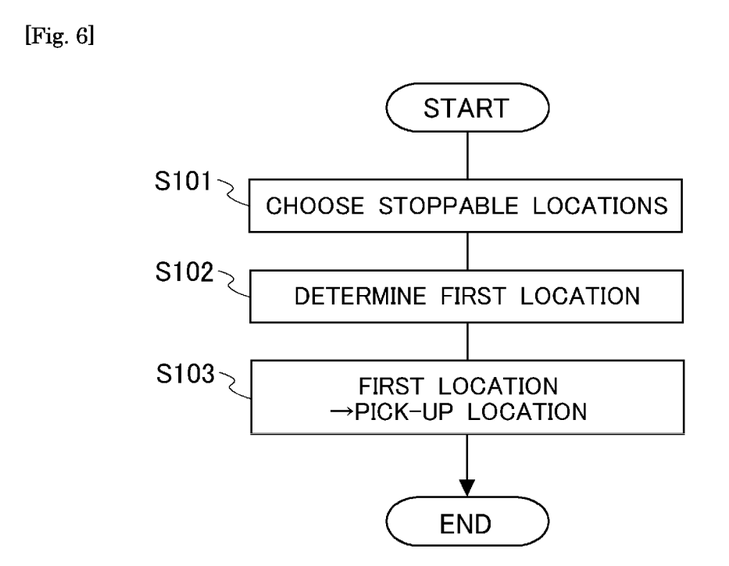
FIG. 6 is a first flow chart of a processing routine executed in the server apparatus to determine a pick-up location for a user.
Figure 7:
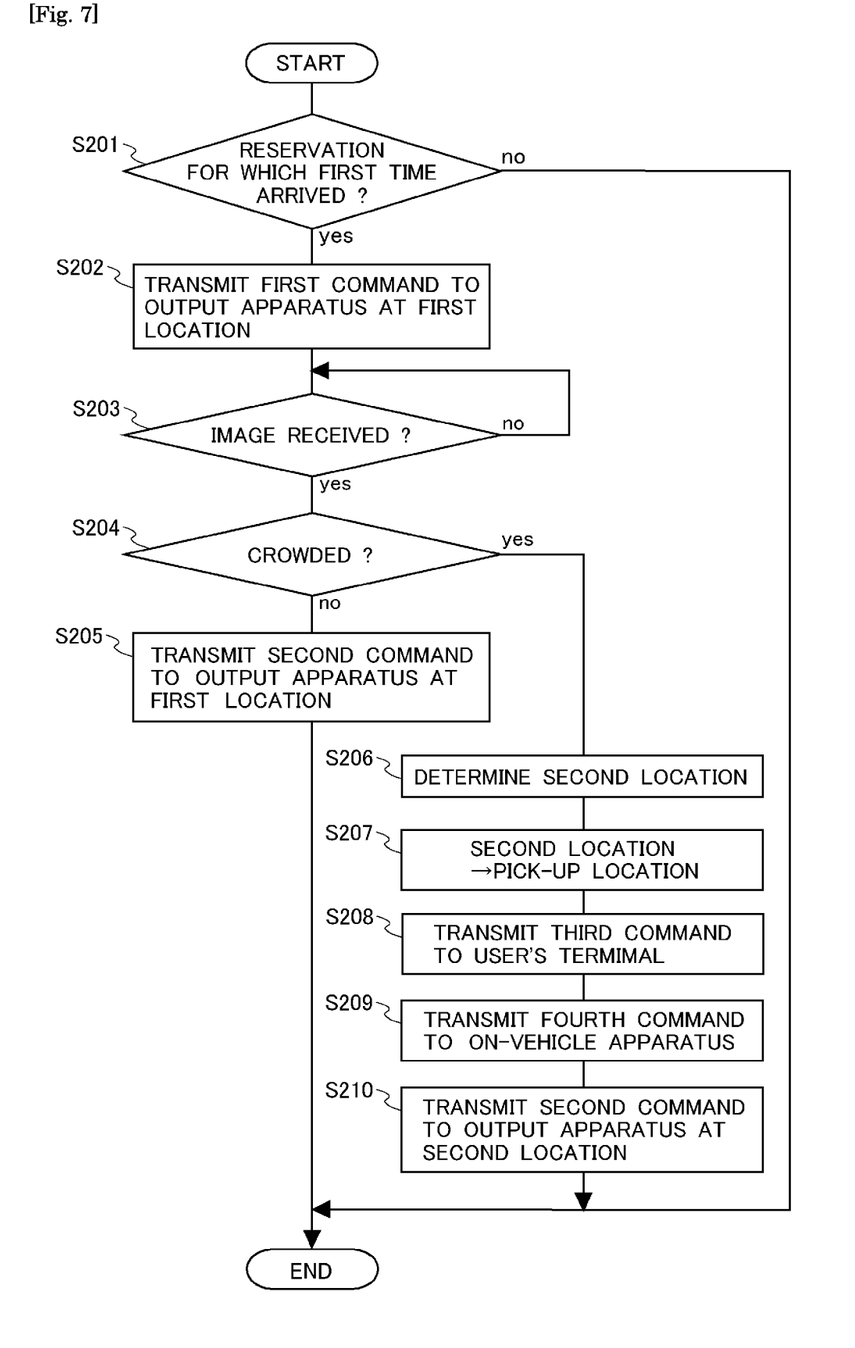
FIG. 7 is a flow chart of a processing routine executed in the server apparatus to determine whether it is necessary to change the pick-up location for the user.

A process executed in the server apparatus 100 will be described with reference to FIGS. 6 and 7. FIG. 6 is a flow chart of a processing routine executed in the server apparatus 100 to determine the pick-up location for the user. FIG. 7 is a flow chart of a processing routine executed in the server apparatus 100 to determine whether it is necessary to change the pick-up location for the user or not.

Firstly, the process of determining the pick-up location for the user will be described with reference to FIG. 6. The processing routine according to the flow chart of FIG. 6 is triggered by, for example, the reception of a request for a ride transmitted from the user's terminal 200 by the communicator 104 of the server apparatus 100. While the processing routine according to the flow chart of FIG. 6 is executed by the processor 101 of the server apparatus 100, software modules of the server apparatus 100 will be mentioned in the following description as the components that execute the processing in the routine.

In the processing routine according to the flow chart of FIG. 6, when the communicator 104 of the server apparatus 100 receives a request for a ride from the user's terminal 200, the controller F110 of the server apparatus chooses stoppable locations located within the second distance from the user's preferred pick-up location based on the preferred pick-up location specified in the request for a ride and information stored in the map information database D130 (step S101). After completing the processing of step S101, the controller F110 executes the processing of step S102 next.

In step S102, the controller F110 selects the first location from among the stoppable locations chosen in step S101. The first location is a stoppable location that is not predicted to be crowded with people during the user's preferred pick-up time zone. To select the first location, specifically, the controller F110 firstly accesses the location management database D110 using the location IDs of the respective stoppable locations chosen in step S101 as arguments. The controller F110 finds the records in which information identical to any one of the location IDs of the respective stoppable locations chosen in step S101 is recorded in the location ID field from among the records stored in the location management database D110. Then, the controller F110 determines stoppable locations that are not predicted to be crowded with people during the user's preferred pick-up time based on the information (scheduled event period) recorded in the event fields of the records thus found and the user's preferred pick-up time zone. If there is only one stoppable location that is not predicted to be crowded with people during the user's preferred pick-up time among the stoppable locations chosen in step S101, the controller F110 determines that stoppable location as the first location. If there are two or more stoppable locations that are not predicted to be crowded with people during the user's preferred pick-up time among the stoppable locations chosen in step S101, the controller F110 determines the stoppable location closest to the user's preferred pick-up location among those stoppable locations as the first location. After completing the processing of step S102, the controller F110 executes the processing of step S103 next.

In step S103, the controller F110 determines the first location determined in step S102 as the pick-up location for the user. After completing the processing of step S103, the controller F110 finishes executing the processing routine according to the flow chart of FIG. 6.

Next, the process of determining whether it is necessary to change the pick-up location for the user or not will be described with reference to FIG. 7. The processing routine according to the flow chart of FIG. 7 is executed by the server apparatus 100 repeatedly at predetermined intervals (e.g. at intervals set between several seconds and several minutes). While the processing routine according to the flow chart of FIG. 7 is executed by the processor 101 of the server apparatus 100, software modules of the server apparatus 100 will be mentioned in the following description as the components that execute the processing in the routine.

In the processing routine according to the flow chart of FIG. 7, the controller F110 of the server apparatus 100 determines whether there is a reservation for which the first time has arrived based on the information stored in the reservation management database D120 (step S201). Specifically, the controller F110 calculates the time that is the first time length earlier than the expected pick-up time recorded in the pick-up time field of the record for each of the reservations stored in the reservation management database D120. The controller F110 determines whether the time thus calculated coincides with the present time. If there is no reservation for which the time that is the first time length earlier than the expected pick-up time coincides with the present time among the reservations stored in the reservation management database D120, the controller F110 determines that there is no reservation for which the first time has arrived (negative answer in step S201). Then, the controller F110 terminates the execution of the processing routine of FIG. 7. If there is a reservation for which the time that is the first time length earlier than the expected pick-up time coincides with the present time among the reservations stored in the reservation management database D120, the controller F110 determines that there is a reservation for which the first time has arrived (affirmative answer in step S201). Then, the controller F110 executes the processing of step S202 next.

In step S202, the controller F110 transmits, through the communicator 104, the first command to the output apparatus 20 at the first location that is set as the pick-up location for the reservation for which the first time has arrived. Specifically, the controller F110 accesses the reservation management database D120 to read out the information recorded in the pick-up location field in the record of this reservation (namely, the location ID of the first location). The controller F110 accesses the location management database D110 using the location ID of the first location as an argument to find the record of the first location. The controller F110 identifies the output apparatus 20 installed at the first location based on the apparatus ID recorded in the apparatus ID field in the record thus found. The control apparatus F110 transmits the first command to the output apparatus 20 at the first location through the communicator 104. As described above, the first command is a signal that contains a command to capture an image of the first location by the camera 30 and a command to transmit the image captured by the camera 30 to the server apparatus 100.

When the communicator 25 of the output apparatus 20 at the first location receives the first command transmitted from the server apparatus 100, the processor 21 causes the camera 30 to capture an image of the first location. Then, the processor 21 of the output apparatus 20 transmits the image captured by the camera 30 to the server apparatus 100 through the communicator 25.

Referring back to FIG. 7, after completing the processing of step S202, the processor 101 of the server apparatus 100 executes the processing of step S203. In step S203, the controller F110 determines whether the communicator 104 has received the image transmitted from the output apparatus 20 at the first location. If the communicator 104 has not received the image transmitted from the output apparatus 20 at the first location (negative answer in step S203), the controller F110 waits until the communicator 104 receives the image transmitted from the output apparatus 20 at the first location. If the communicator 104 receives the image transmitted from the output apparatus 20 at the first location (affirmative answer in step S203), the controller F110 executes the processing of step S204 next.

In step S204, the controller F110 executes image recognition processing on the image received from the output apparatus 20 at the first location to determine whether the first location is crowded with people. In other words, the controller F110 determines whether the state of crowding (or the presence/absence of crowding) at the first location is as predicted at the time when the first location was determined. If it is determined that the first location is not crowded (negative answer in step S204), the controller F110 executes the processing of step S205 next.

In step S205, the controller F110 transmits the second command to the output apparatus 20 at the first location through the communicator 104. As described above, the second command is a signal that contains a command to output a bus stop sign.

When communicator 25 of the output apparatus 20 at the first location receives the second command transmitted from the server apparatus 100, the processor 21 of the output apparatus 20 causes the display to output a bus stop sign.

Referring back to FIG. 7, after completing the processing of step S205 the controller F110 of the server apparatus 100 finishes executing the processing routine according to the flow chart of FIG. 7.

If it is determined in step S204 that the first location is crowded with people contrary to the prediction made at the time of determining the first location (affirmative answer in step S204), the controller F110 executes the processing of steps S206 through S210. The order of executing steps 208 to S210 among steps S206 to S210 is not limited to the order illustrated in FIG. 7.

In step S206, the controller F110 determines the second location. The second location is a stoppable location that is located within the second distance from the first location and not actually crowded with people. When determining the second location, the controller F110 firstly chooses stoppable locations located within the second distance from the first location based on the map information stored in the map information database D130. The controller F110 accesses the location management database D110 using the location IDs of the stoppable location chosen as above as arguments to find the records corresponding to the chosen stoppable locations. The controller F110 identifies the output apparatuses 20 installed at the chosen stoppable locations based on the information (location IDs) recorded in the apparatus ID fields of the records thus found.

The controller F110 transmits the first command to the output apparatuses 20 identified as above through the communicator 104. When the communicator 104 of the server apparatus 100 receives an image transmitted from the output apparatus 20 in response to the first command, the controller F110 executes image recognition processing on the received image to determine whether the chosen stoppable location in question is not actually crowded with people. This determination processing is executed for all the stoppable locations located within the second distance from the first location.

If there is only one stoppable location that is determined to be not actually crowded among the stoppable locations that are located within the second distance from the first location, the controller F110 determines that stoppable location as the second location. If there are two or more stoppable locations that are determined to be not crowded among the stoppable locations that are located within the second distance from the first location, the controller F110 determines the stoppable location closest to the first location among those two or more stoppable locations as the second location.

After determining the second location through the above-described process, the controller F110 executes the processing of step S207. In step S207, the controller F110 changes the pick-up location for the reservation for which the first time has arrived from the first location to the second location. Specifically, the controller F110 changes the information recorded in the pick-up location field of the corresponding record stored in the reservation management database D120 from the location ID of the first location to the location ID of the second location. After completing the processing of step S207, the controller F110 executes the processing of step S208 next.

In step S208, the controller F110 transmits, through the communicator 104, the third command to the user's terminal 200 of the user associated with the reservation for which the first time has arrived. As described above, the third command is a signal that contains a command to cause the input and output unit 204 of the user's terminal 200 to output a message indicating the change of the pick-up location from the first location to the second location and location information of the second location.

When the communicator 206 of the user's terminal 200 receives the third command transmitted from the server apparatus 100, the processor 201 causes the input and output unit 204 to output the message indicating the change of the pick-up location from the first location to the second location and the location information of the second location. In consequence, the user can know the change of the pick-up location for the on-demand bus 1 from the first location to the second location and the location of the second location.

Referring back to the flow chart of FIG. 7, after completing the processing of step S208, the controller F110 of the server apparatus 100 executes the processing of step S209 next. In step S209, the controller F110 transmits, through the communicator 104, the fourth command to the on-vehicle apparatus 10 of the on-demand bus 1 dispatched for the reservation for which the first time has arrived. The fourth command is a signal that contains a command to change the pick-up location for this reservation from the first location to the second location and a command to cause the signage device 14 to output a bus stop sign when the on-demand bus 1 arrives at the second location.

When the communicator 15 of the on-vehicle apparatus 10 of the on-demand bus 1 dispatched for the reservation for which the first time has arrived receives the fourth command transmitted from the server apparatus 100, the processor 11 of the on-vehicle apparatus 10 modifies the operation plan of the on-demand bus 1. Specifically, the processor 11 changes the pick-up location among the pick-up locations included in the operation plan that is set at the first location from the first location to the second location. The processor 11 sends the modified operation plan to the control apparatus of the on-demand bus 1. In consequence, the control apparatus can autonomously drive the on-demand bus 1 according to the modified operation plan. In other words, the control apparatus can cause the on-demand bus 1 not to stop at the first location, but to stop at the second location instead. When the on-demand bus 1 arrives at the second location, the processor 11 of the on-vehicle apparatus 11 can output a bus stop sign through the signage device 14.

Referring back to FIG. 7, after completing the processing of step S209, the controller F110 of the server apparatus 100 executes the processing of step S210 next. In step S210, the controller F110 transmits the second command to the output apparatus 20 at the second location through the communicator 104. As described above, the second command is a signal that contains a command to output a bus stop sign.

When the communicator 25 of the output apparatus 20 at the second location receives the second command transmitted from the server apparatus 100, the processor 21 causes the display 24 to output a bus stop sign. In this way, if the pick-up location for the user is changed from the first location to the second location, it is possible to cause the output apparatus 20 at the first location not to output a bus stop sign, but to cause the output apparatus 20 at the second location to output a bus stop sign.

Referring back to FIG. 7, after completing the processing of step S210, the controller F110 of the server apparatus 100 finishes executing the processing routine according to the flow chart of FIG. 7.

(Operation and Advantageous Effects of Embodiment)

The system according to the embodiment sets the pick-up location for the on-demand bus 1 at a location (first location) that is not predicted to be crowded with people due to an event. If the first location is crowded with people at a time (first time) shortly before the expected pick-up time for the user contrary to the prediction, the system according to the embodiment changes the pick-up location for the on-demand bus 1 to a location (second location) that is not actually crowded with people. Thus, the system according to the embodiment can set the pick-up location for the on-demand bus 1 at a location that is not crowded. In consequence, the user can be prevented from encountering difficulties in finding or approaching the pick-up location due to crowding of people.

The system according to the embodiment sets the pick-up location for the on-demand bus 1 at a location (first or second location) where an apparatus (output apparatus 20) that can output a bus stop sign is installed. Thus, it is possible to output a bus stop sign using the output apparatus 20 installed at the pick-up location. This allows the user to get to the pick-up location for the on-demand bus 1 using the bus stop sign output by the output apparatus 20 as a mark. In particular, in the case where the pick-up location for the on-demand bus 1 is changed from the first location to the second location, the system according to the embodiment does not cause the output apparatus 20 at the first location to output a bus stop sign but to cause the output apparatus 20 at the second location to output a bus stop sign, thereby allowing the user to get to the pick-up location without going astray. Since the system according to the embodiment sets the pick-up location for the on-demand bus 1 at a location that is not crowded, the user is not likely to encounter difficulties in seeing the bus stop sign output by the output apparatus 20 or approaching the pick-up location.

In the case where the pick-up location for the on-demand bus 1 is changed from the first location to the second location by the system according to the embodiment, the signage device 14 on the on-demand bus 1 also outputs a bus stop sign when the on-demand bus arrives at the second location. Thus, the user can use at least one of the bus stop sign output by the output apparatus 20 at the second location and the bus stop sign output by the signage device 14 on the on-demand bus 1 as a mark to get to the second location.

As above, the system according to the embodiment allows the user to board the on-demand bus smoothly.

<Others>

The above embodiment has been described only by way of example. The technology disclosed herein can be implemented in modified manners without departing from the essence of this disclosure. For example, it is not necessary for the server apparatus 100 to execute both the processing routine according to the flow chart of FIG. 6 and the processing routine according to the flow chart of FIG. 7, but it may be configured to only one of them.

One or some of the processes that have been described as processes performed by one apparatus may be performed by a plurality of apparatuses in a distributed manner. One or some of the processes that have been described as processes performed by different apparatuses may be performed by one apparatus. For example, the processing executed in the server apparatus 100 may be partly executed by another apparatus connected with the server apparatus 100 through the network N1. In other words, two separate computers connected via the network N1 may be used, one to manage the operations of the on-demand bus 1 and the other to control the output apparatus 20. The hardware configuration employed to implement various functions in a computer system may be modified flexibly.

The technology disclosed herein can be implemented by supplying a computer program(s) that implements the functions described in the above description of the embodiment to the server apparatus 100 to cause one or more processors of the server apparatus 100 to read out and execute the program(s). Such a computer program(s) may be supplied to the server apparatus 100 by a non-transitory, computer-readable storage medium that can be connected to a system bus of the server apparatus 100, or through a network. The non-transitory, computer-readable storage medium is a recording medium that can store information such as data and programs electrically, magnetically, optically, mechanically, or chemically in a computer-readable manner. Examples of such a recording medium include any type of discs including magnetic discs, such as a floppy disc (registered trademark) and a hard disk drive (HDD), and optical discs, such as a CD-ROM, a DVD, and a Blu-ray disc. The recording medium may also be a read-only memory (ROM), a random access memory (RAM), an EPROM, an EEPROM, a magnetic card, a flash memory, an optical card, a solid state drive (SSD), or other medium.

What is claimed is:

1. An information processing apparatus configured to determine a pick-up location for an on-demand bus, comprising a controller including at least one processor, the controller being configured to determine a first location that is not predicted to be crowded with people as the pick-up location based on a pick-up location that a user prefers and first information related to locations that are predicted to be crowded with people,
- wherein the controller is configured to further execute the processing of:
- determining whether the first location is crowded with people at a first time earlier than an expected pick-up time for the user;
- if it is determined that the first location is crowded with people, changing the pick-up location from the first location to a second location that is not crowded with people; and
- transmitting information on the second location to a user's terminal used by the user,
- wherein the first time is the time at which a distance between the first location and the user's terminal becomes shorter than a first predetermined distance.

2. The information processing apparatus according to claim 1, wherein the first information includes information on whether or not a gathering is scheduled to be held in facilities respectively linked with locations in the operation area of the on-demand bus, and the controller selects the first location from among the locations linked with facilities where no gathering is scheduled to be held.

3. The information processing apparatus according to claim 1, wherein the first location is a location where the on-demand bus can stop and equipment capable of outputting a bus stop sign is installed.

4. The information processing apparatus according to claim 1, wherein the controller determines whether the first location is crowded with people based on an image captured by a camera installed at the first location.

5. The information processing apparatus according to claim 1, wherein the controller determines the second location based on images captured by cameras installed at a plurality of locations located within a second distance from the first location.

6. The information processing apparatus according to claim 1, wherein the second location is a location where equipment capable of outputting a bus stop sign is installed.

7. The information processing apparatus according to claim 1, wherein the on-demand bus is provided with a signage device to display information to the outside of the bus, and the controller causes the signage device to output a bus stop sign when the on-demand bus arrives at the second location.

8. An information processing method for determining a pick-up location for an on-demand bus comprising determining, by a computer, a first location that is not predicted to be crowded with people as the pick-up location based on a pick-up location that a user prefers and first information related to locations that are predicted to be crowded with people,
- wherein the computer further executes the processing of:
- determining whether the first location is crowded with people at a first time earlier than an expected pick-up time for the user;
- if it is determined that the first location is crowded with people, changing the pick-up location from the first location to a second location that is not crowded with people; and
- transmitting information on the second location to a user's terminal used by the user,
- wherein the first time is the time at which a distance between the first location and the user's terminal becomes shorter than a first predetermined distance.

9. The information processing method according to claim 8, wherein the first information includes information on whether or not a gathering is scheduled to be held in facilities respectively linked with locations in the operation area of the on-demand bus, and the computer selects the first location from among the locations linked with facilities where no gathering is scheduled to be held.

10. The information processing method according to claim 8, wherein the first location is a location where the on-demand bus can stop and equipment capable of outputting a bus stop sign is installed.

11. The information processing method according to claim 8, wherein the computer determines whether the first location is crowded with people based on an image captured by a camera installed at the first location.

12. The information processing method according to claim 8, wherein the computer determines the second location based on images captured by cameras installed at a plurality of locations located within a second distance from the first location.

13. The information processing method according to claim 8, wherein the second location is a location where equipment capable of outputting a bus stop sign is installed.

14. The information processing method according to claim 8, wherein the on-demand bus is provided with a signage device to display information to the outside of the bus, and the computer causes the signage device to output a bus stop sign when the on-demand bus arrives at the second location.

* * * * *